United States Patent [19]
Minderlein et al.

[11] Patent Number: 5,614,796
[45] Date of Patent: Mar. 25, 1997

[54] METHOD FOR PROVIDING CONTINUOUS POWER TO ELECTRICAL RAIL VEHICLE SYSTEMS WHEN RAIL POWER IS INTERRUPTED

[75] Inventors: Erich Minderlein, Vellmar; Anton Völkl, Römerberg; Jens Hinze, Hohenstein-Ernstthal, all of Germany

[73] Assignee: ABB Patent GmbH, Mannheim, Germany

[21] Appl. No.: 369,188

[22] Filed: Jan. 5, 1995

[30] Foreign Application Priority Data

Jul. 6, 1994 [DE] Germany .................. 44 23 692.1

[51] Int. Cl.⁶ .................................................. H02P 3/00
[52] U.S. Cl. ........................... 318/376; 246/182 A
[58] Field of Search ................................. 318/371, 375, 318/376; 246/1 C, 27, 28 R, 48–50, 74, 75, 179, 182 R, 182 B, 182 A; 104/288, 289, 293, 300

[56] References Cited

U.S. PATENT DOCUMENTS

| | | | |
|---|---|---|---|
| 3,638,093 | 1/1972 | Ross | 318/687 |
| 4,095,154 | 6/1978 | Williamson | 318/376 |
| 4,108,077 | 8/1978 | Laing | 104/156 |
| 4,326,154 | 4/1982 | Lewis et al. | 318/376 |
| 4,453,113 | 6/1984 | Merlino et al. | 318/376 |
| 5,283,507 | 2/1994 | Stitt et al. | 318/376 |
| 5,331,261 | 7/1994 | Brown et al. | 318/376 |

FOREIGN PATENT DOCUMENTS 2-219401  9/1990  Japan.

OTHER PUBLICATIONS

AEG–Telefunken Publ. 61(1971)6 (Putz), pp. 320–324, "Gleichstromsteller für die Speisung von Fahrmotoren...".
EB Publ. 80, No. 11, 1982 (Brüge et al.), pp. 318,320 322, "Das Stromgeführte Drehstromantriebssystem...".
ELIN Publ. 1/2 1990 (Schiftner), pp. 7–20, "Antriebs–systeme für die Traktion".
ELIN Publ. 1/2 1990 (Trenner et al.), pp. 27–30, "Überbrückung von Netzspannungseinbrüchen oder...".
Patent Abstract of Japan No. JP 58–218801, Dec. 20, 1983 (Hidemi et al.).
Patent Abstract of Japan No. JP 63–186505, Aug. 2, 1988 (Tomoaki).
Patent Abstract of Japan No. JP 12–64501, Oct. 20, 1989, (Hideaki).

*Primary Examiner*—Jonathan Wysocki
*Attorney, Agent, or Firm*—Herbert L. Lerner; Laurence A. Greenberg

[57] ABSTRACT

A method bridges gaps in a power supply for electrical, converter-fed rail vehicles having front and rear ends with front and rear current collectors, as seen in a travel direction, for making contact with the power supply. The method includes switching a traction converter from a traction mode to a regenerative braking mode, that is to say a generator operation or from a braking mode to the regenerative braking mode. The switching takes place over a period during which the rail vehicle travels a distance. If possible, the distance is only slightly shorter than a distance between the front and rear current collectors. This occurs as soon as the front current collector is not in contact with the power supply.

6 Claims, 2 Drawing Sheets

5,614,796

METHOD FOR PROVIDING CONTINUOUS POWER TO ELECTRICAL RAIL VEHICLE SYSTEMS WHEN RAIL POWER IS INTERRUPTED

BACKGROUND OF THE INVENTION

Field of the Invention

The invention relates to a method for bridging gaps in a power supply for electrical, converter-fed rail vehicles, wherein the rail vehicles are provided at both ends with current collectors for making contact with the power supply.

In rail vehicles being fed through a so-called third rail, that is to say a current rail, severe interruptions with respect to the power feeding occur, for example, in the area of points, crossings and joints. Apart from the unavoidable loss of traction force, that results in an interruption of the train power supply system which can be detected, for example, by a failure of illumination. When a gap occurs in the conductor rail, a fault detection system usually responds, which results in a discharge of storage capacitors of the power feeding circuit and an opening of a switch for the train power supply system. The consequence thereof is frequent start-ups of the drives and an increased failure rate of components such as motors, illumination, high-speed circuit breakers, charging circuit for storage capacitors and so forth. Furthermore, there is a disadvantageous period of time until the converters being used for feeding the drive motors are in operation again after the end of the gap in the conductor rail and the train power supply system is connected in the circuit again.

SUMMARY OF THE INVENTION

It is accordingly an object of the invention to provide a method for bridging gaps in the power supply for electrical rail vehicles, which overcomes the hereinafore-mentioned disadvantages of the heretofore-known methods of this general type, which prevents a fault detection system from responding when a power supply gap occurs and which ensures an optimum passage of a train over a power supply gap.

With the foregoing and other objects in view there is provided, in accordance with the invention, in a method for bridging gaps in a power supply for electrical, converter-fed rail vehicles having front and rear ends with front and rear current collectors, as seen in a travel direction, for making contact with the power supply, the improvement which comprises switching a traction converter from a traction mode to a regenerative braking mode, that is to say a generator operation or from a braking mode to the regenerative braking mode, over a period during which the rail vehicle travels a distance if possible being only slightly shorter than a distance between the front and rear current collectors, as soon as the front current collector is not in contact with the power supply.

The advantages which can be achieved by means of the invention are especially that the rail vehicle is capable of passing over power supply gaps which are unavoidable due to the topology of the section (points, crossings, joints), with minimum interruption in the traction force and without interruption or with only a short interruption in the train power supply, and at any speed. When the rail vehicle enters a power supply gap, both the length of the gap and the length of the power supply (conductor rails) following it are unknown. Nevertheless, a reliable switch-over of the power flow is ensured without a jolt within the compound train and without an unnecessary interruption of the train power supply. This utilizes the fact that the power flow can be reliably switched over as long as the rear current collector, as seen in the direction of travel, is still in contact with the power supply. This protects the components of the compound train which is reflected in an increased life or durability. It increases the comfort for the passengers in the train since gaps in the conductor rail are passed without a jolt and there is no failure of illumination.

In accordance with another mode of the invention, there is provided a method which comprises predetermining a nominal regenerative braking value for the traction converter in dependence on a travelling speed of the rail vehicle, a power requirement of a train power supply system and an inherent requirement of electrical components of the rail vehicle.

In accordance with a further mode of the invention, there is provided a method which comprises additionally determining a reserve in a dynamic range in an input of the nominal regenerative braking value, and converting a resulting addition of energy into heat in a braking resistor through a braking controller.

In accordance with an added mode of the invention, there is provided a method which comprises switching off the train power supply system during the regenerative braking mode when the travelling speed of the rail vehicle is too low in comparison with the power requirement of the train power supply system.

In accordance with an additional mode of the invention, there is provided a method which comprises additionally inhibiting all converters if the travelling speed of the rail vehicle drops below a critical lower value, for setting a blocking mode.

In accordance with yet another mode of the invention, there is provided a method which comprises ending the regenerative braking mode or a blocking mode when the front and rear current collectors are again in contact with the power supply and when additionally the front current collectors are uninterruptedly in contact with the power supply over a period during which the rail vehicle travels a distance being greater than a distance between the front and rear current collectors.

In accordance with a concomitant mode of the invention, there is provided a method which comprises detecting at least one of a duration and a distance of a power supply gap and outputting error messages when at least one of predetermined durations and distance values are exceeded, with a diagnostic system.

Other features which are considered as characteristic for the invention are set forth in the appended claims.

Although the invention is illustrated and described herein as embodied in a method for bridging gaps in the power supply for electrical rail vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
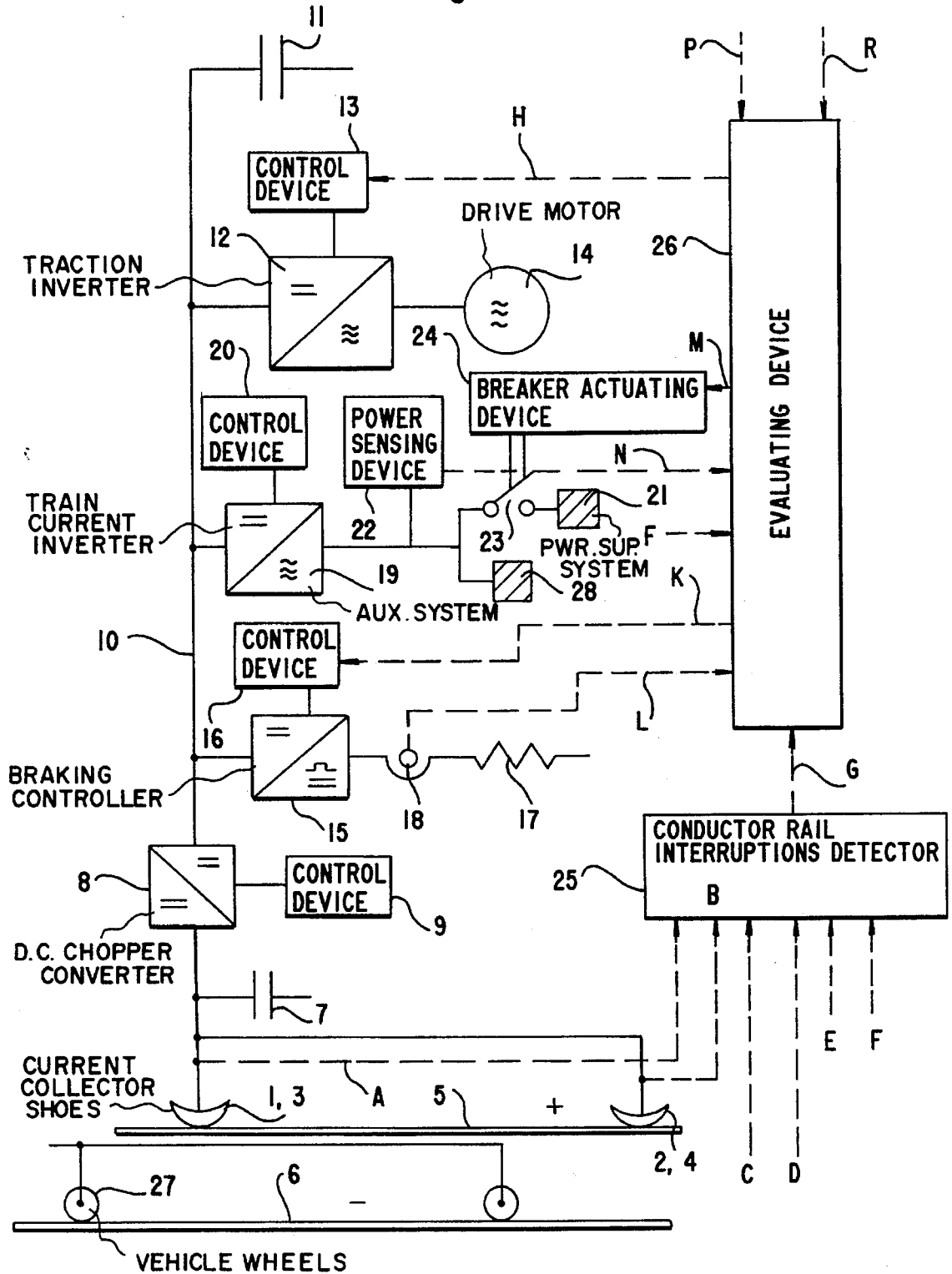
FIG. 1 is a diagrammatic and block circuit diagram showing essential electrical components of a locomotive operated on conductor rails, including components of a method for bridging gaps in a power supply.

Referring now to the figures of the drawing in detail and first, particularly, to FIG. 1 thereof, there are seen essential electrical components of a locomotive (which is generally a rail vehicle) operated on conductor rails (generally on a power supply) with components of a method for bridging gaps in the power supply. Four current collector shoes 1, 2, 3, 4 (which are generally referred to as current collectors) of a locomotive are shown. The current collector shoes 1, 2 are in contact with a right-hand positive conductor rail and the current collector shoes 3, 4 are in contact with a left-hand positive conductor rail. For example, 650 volts direct voltage are applied to the positive conductor rails 5, whereas vehicle wheels 27 and rails 6 serve as a negative current return line (ground). The current collector shoes 1, 3 are mounted at a front end of the locomotive while the current collector shoes 2, 4 are located at a rear end of the locomotive. Electrical terminals of all of the current collector shoes 1, 2, 3, 4 are connected to one another, they form a positive terminal and they lead to a storage capacitor 7 and to a d.c. chopper converter 8 with control device 9. Electrical terminals of axle brushes of the vehicle wheels 27 are also connected to one another and form a negative terminal for the electrical components of the locomotive. The d.c. chopper converter 8 feeds a d.c. link circuit 10 with a storage capacitor 11.

A traction inverter 12 (which is generally referred to as a traction converter) with a control device 13 which is used for feeding a drive motor 14 (or several drive motors), is connected to the d.c. link circuit 10. Furthermore, a braking controller 15 with a control device 16 is connected to the d.c. link circuit 10. If necessary, the braking controller 15 acts upon a braking resistor 17 and a current sensing device 18 is used for measuring the braking current.

Furthermore, a train current inverter 19 with a control device 20 is connected to the d.c. link circuit 10. This train current inverter 19 feeds auxiliary locomotive systems 28 and a train power supply system 21. The power of both systems 21, 28 are measured by a power sensing device 22. A circuit breaker 23 with a breaker actuating device 24 can be used for isolating the train current inverter 19 from the train power supply system 21.

Reference numeral 25 identifies a device for detecting conductor rail interruptions. Signals A, B, C, D of the current collector shoes 1, 2, 3, 4 are present at this device 25. It is possible, for example, to generate the signals A, B, C, D with the aid of limit switches which detect whether or not there is a contact between the conductor rail and the corresponding current collector shoe. As an alternative, the current which flows through each individual current collector shoe can also be evaluated. The A, C and B, D signals are combined into respective "front" and "rear" signals. When the locomotive reverses, the "front" and "rear" signals are crossed over. The "forward" or "reverse" direction of locomotive travel is signalled to the device 25 through a signal E.

Figure 2:
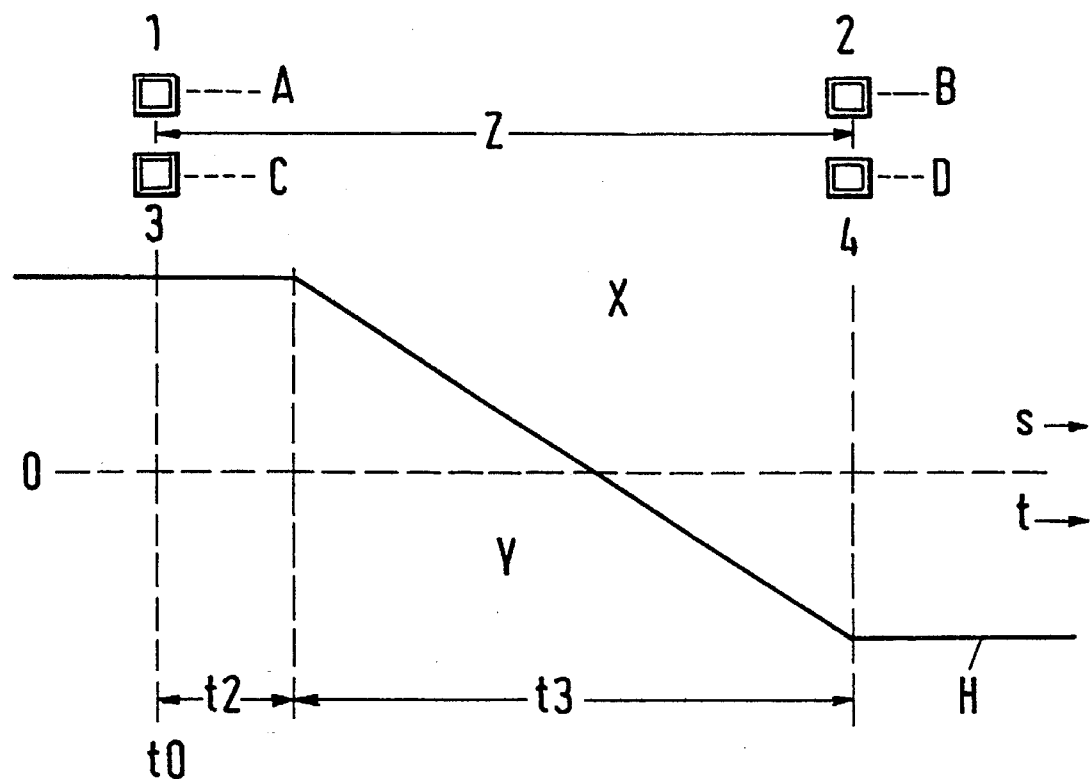
FIG. 2 is a diagram showing a process of switching over from a traction mode to a regenerative braking mode.

According to the following considerations, a signal A, B, C, D is present when the relevant current collector shoe 1, 2, 3, 4 is in contact with the conductor rail. When both signals of the front current collector shoes, as seen in the direction of travel (signals A and C in the case of forward travel), are missing, a memory is set inside the device 25 which generates a current gap signal G. As is seen in FIG. 2, this memory is only reset, (that is to say the signal G is only removed) when the current collector shoes are again in contact with the conductor rails in accordance with a condition (A∨C)∩(B∨D) and when additionally the front current collector shoe as seen in the direction of travel is uninterruptedly in contact with the conductor rail during a period t1 during which the locomotive travels a distance that is greater than a distance Z between the front and rear current collector shoes. The latter measure avoids moving into a second conductor rail gap which occurs shortly after a first conductor rail gap, without the locomotive being appropriately prepared for the regenerative braking mode. In order to calculate this period t1, the device 25 is informed about a speed F of the locomotive. The period t1 can be determined from the signals F and Z.

If the current gap signal G is present, an evaluating device 26 intervenes in the power control process of the locomotive, while taking into consideration the operating limits, particularly of the d.c. link circuit control. The evaluating device 26 calculates a nominal regenerative braking value H for the traction inverter 12 or its control device 13 in dependence on the speed F of the locomotive and in dependence on the power required for the train power supply system 21, with the inherent requirement of the electrical components of the rail vehicle including recharging power for the storage capacitors and including losses. A power signal N of the power sensing device 22 represents powers required from the system 21 and the auxiliary systems 28. In this connection it is provided for the traction inverter 12 to be switched over in the manner of a ramp from motor operation (traction braking mode) into generator operation (regenerative braking mode) during a period (indicated by reference symbol t3 in FIG. 2) during which the locomotive travels a distance which, if possible, corresponds to a distance Z between the front and rear current collector shoes or is slightly shorter than that distance due to unavoidable delays. This switch-over process applies to the case in which the locomotive is in motor operation shortly before the conductor rail gap occurs. As soon as both the front and the rear current collector shoes are no longer in contact with the conductor rail, the drive motor 14 must operate in the generator mode and feed both the power required by the train power supply system 21 and the inherent power required by the electrical components of the locomotive into the d.c. link circuit 10 through the traction inverter 12. The nominal regenerative braking value H for passing over the conductor rail gap should also contain a reserve in a dynamic range in order to compensate for fast fluctuations in power demand. Such fluctuations in power demand are corrected by means of the braking controller 15. In other words, the additional energy due to the reserve in the dynamic range is converted into heat in the braking resistor 17 through the braking controller 15. Correspondingly, a nominal-value signal K corresponding to the reserve in the dynamic range and the fluctuations in power demand is applied to the braking controller 15 and its control device 16. The braking controller current is controlled in such a manner that the reserve in the dynamic range is retained even with fluctuations in power demand, that is to say particularly in the case of a change in the power consumed by the train power supply system 21. In order to provide the control, a braking controller current signal L of the current sensing device 18 is present at the evaluating device 26.

In principle, the above statements also apply to the case in which the locomotive is in the braking mode (feeding back into the system or braking controller mode) shortly before a conductor rail gap occurs. For this case, the nominal regenerative braking value H must be dimensioned in such a manner that both the required braking torque or the braking power for the train is achieved and the supply of the train power supply system 21 and the inherent demand of the electrical components are ensured, in which connection a reserve in the dynamic range is also to be provided.

The evaluating device 26 determines the current or present type of operation (motor operation or braking operation) from an input for nominal traction and braking values P by the driver of the locomotive. In order to achieve a minimum or no jolt in the compound train and a minimum dynamic response in the d.c. link circuit, that is to say minimum compensation processes, when conductor rail gaps occur, the entire period, if possible, is utilized for switching from motor operation (traction mode) into generator operation (regenerative braking mode) or for switching from braking operation to regenerative braking mode, during which period the locomotive travels a distance which corresponds to the distance Z between the front and rear current collector shoes. This correspondingly results in a temporally linear ramp-shaped change in the force of the locomotive as can be seen from FIG. 2 which shows the switch-over process from the traction mode to the regenerative braking mode.

FIG. 2 shows the distance Z between the front current collector shoes 1, 3 and the rear current collector shoes 2, 4. Reference symbol s designates the distance travelled by the locomotive and t designates the time. At a time t0, one of the front current collector shoes 1, 3 encounters a conductor rail gap. The locomotive is in a traction mode X. After an unavoidable delay time t2, the evaluating device 26 intervenes in the power control of the locomotive through the nominal regenerative braking value H and the locomotive is switched over linearly and in the manner of a ramp from the traction operation X to a regenerative braking operation Y during the switch-over time t3. The ramp must be as shallow as possible in order to provide optimum protection for the components and to achieve maximum travelling comfort. After the switch-over time t3 has elapsed, the rear current collector shoes 2, 4 encounter the conductor rail gap. In other words, from that time, none of the current collector shoes are still in contact with the conductor rail and the locomotive is travelling in the regenerative braking mode until the conductor rail gap has ended or until the blocking mode described below has to be specified.

The switch-over time t3 which is available for switching from the traction operation X to the regenerative braking operation Y depends on the travelling speed F of the vehicle and is therefore calculated as a function of F by the evaluating device 26. When the switch-over time t3 is known, the evaluating device 26 acts in dependence on the signal P that is defined as the "input of nominal traction or braking value" of the driver and the required nominal regenerative braking value H, to calculate a switch-over time constant with which a ramp-function generator controls the traction converter 12 from the input of the nominal traction or braking value of the driver to the nominal regenerative braking value H. When the switch-over begins, the input values of the locomotive driver and the switch-over time constant are stored since the switch-over changes the input value of the driver of the locomotive. Due to the nature of the normalization of characteristics, a ramp-function generator time (which equals a switch-over time constant) must be calculated in each case for traction and braking. It is appropriate to limit the switch-over time constant between a predetermined maximum value and a predetermined minimum value.

Due to the fact that the driving force of the locomotive changes linearly with time and fills up the available period of time, the components of the locomotive and of the compound train are protected, which has an advantageous effect on the shelf life or durability. This also increases the comfort for passengers since jolting in the compound train is reduced or prevented.

Apart from the regenerative braking mode with feeding of the train power supply system as described above, other operating modes are possible when passing over a conductor rail gap. If the braking torque which is predetermined through the nominal regenerative braking value H is too large, for example because the travelling speed of the locomotive is too low in comparison with the power requirement of the train power supply system 21, the train power supply system must be switched off, which is performed through a signal M sent from the evaluating device 26 to the circuit breaker actuating device 24. In consequence, the circuit breaker 23 (power contactor) is opened. At the same time, the signals H and K are correspondingly changed since only the inherent demand of the electrical components (capacitor recharging, losses) need be covered (auxiliary locomotive system 28) in this operating mode (regenerative braking mode without feeding the train power supply system).

If the speed of the compound train drops below a critical lower value in the aforementioned regenerative braking mode without feeding the train power supply system 21, the evaluating device 26 switches over to the "blocking mode". In this operating mode, the entire power transformation is blocked in addition to the switching-off of the train power supply system so that a maximum rolling distance of the compound train is achieved without power feeding. The storage capacitors 7, 11 must be dimensioned in such a manner that they reliably remain charged to a minimum level during a predeterminable period of time so that traction operation can be rapidly resumed in a simple manner through the traction inverter 12 after the conductor rail gap has ended.

Figure 3:
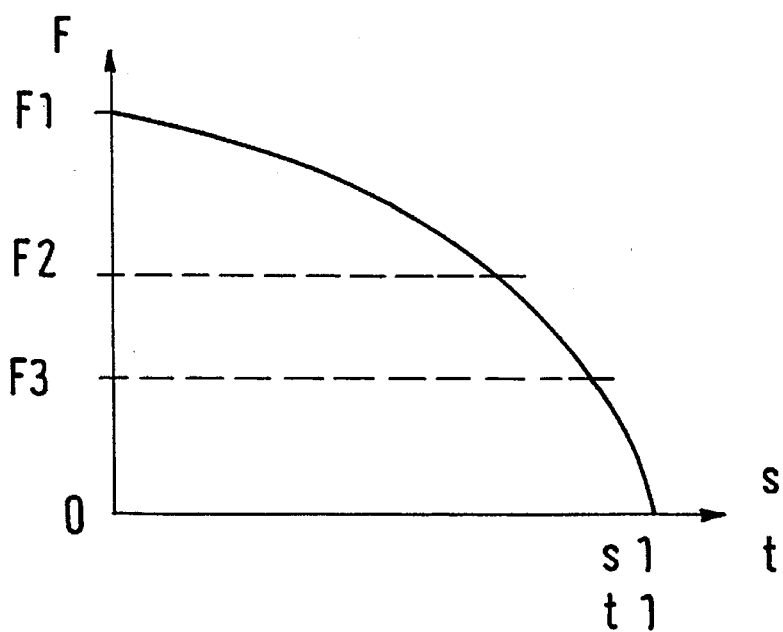
FIG. 3 is a speed/distance time diagram for the regenerative braking mode.

The time during which it is necessary to switch from the "regenerative braking mode with feeding of the train power supply system" mode to the "regenerative braking mode without feeding if the train power supply system" mode and to the "blocking mode", can be seen from FIG. 3, in which a speed/distance, time diagram is shown for the regenerative braking mode. It can be seen that at a speed F1 of the locomotive at the beginning of the regenerative braking operation, only a certain distance s1 can be travelled until the train comes to a standstill, during which it is only possible to maintain the regenerative braking mode for a particular period t1. It is therefore necessary to switch to the regenerative braking mode without feeding the train power supply system when a speed F2 is reached or to switch to the "blocking mode" when a speed F3 (which equals a critical lower value) is reached. The respective maximum possible distances s of the locomotive or the maximum periods for which the compound train can roll without power feeding, are correspondingly extended.

Independently of this, the driver of the locomotive can also end the regenerative braking operation and select the blocking mode if this is required by the situation. That is done by sending a signal R to the evaluating device 26.

The evaluating device 26 also contains a diagnostic device having a number of functions. According to a first function, the duration of the occurrence of a conductor rail gap is determined. If a predeterminable period is exceeded, an error message is produced. According to a second function, the length of a conductor rail gap is determined. If this length exceeds a predeterminable value, an error message is produced. The evaluating device 26 preferably switches off the regenerative braking mode and the blocking mode when there is an error message. Error messages that occur can be used, for example, for detecting damage to the current collector shoes (for example when a sliding contact is broken off). According to a third function, meaningless combinations of signals of the current collector shoes are detected, which also results in an error message.

The above assumes a system which can have a right-hand or a left-hand conductor rail depending on the typographic requirement. Accordingly, the locomotive is equipped with right-hand and left-hand current collector shoes. Other systems can be constructed which only require one front and one rear current collector shoe, for example when the positive conductor rail is disposed in the center between the rails.

In the illustrative embodiment described above, it is assumed that the rail vehicle is fed through current collector shoes which are in contact with conductor rails. However, the method according to the invention is not restricted thereto but can also be used in the case of rail vehicles which are operated through overhead contact wire lines.

We claim:

1. In a method for bridging gaps in a power supply for electrical, converter-fed rail vehicles having front and rear ends with front and rear current collectors, as seen in a travel direction, for making contact with the power supply, the improvement which comprises:

switching a traction converter from a traction mode to a regenerative braking mode over a period during which the rail vehicle travels a distance, as soon as the front current collector is not in contact with the power supply;

switching the traction converter from a braking mode to the regenerative braking mode;

switching the traction converter over a period during which the rail vehicle travels a distance being shorter than a distance between the front and rear current collectors;

predetermining a nominal regenerative braking value for the traction converter in dependence on a traveling speed of the rail vehicle, a power requirement of a train power supply system and an inherent requirement of electrical components of the rail vehicle; and ending the regenerative braking mode when the front and rear current collectors are again in contact with the power supply and when additionally the front current collectors are uninterruptedly in contact with the power supply over a period during which the rail vehicle travels a distance being greater than a distance between the front and rear current collectors.

2. The method according to claim 1, which comprises additionally determining a reserve in a dynamic range in an input of the nominal regenerative braking value, and converting a resulting addition of energy into heat in a braking resistor through a braking controller.

3. The method according to claim 1, which comprises switching off the train power supply system during the regenerative braking mode when the travelling speed of the rail vehicle is too low in comparison with the power requirement of the train power supply system.

4. The method according to claim 3, which comprises additionally inhibiting all converters if the travelling speed of the rail vehicle drops below a critical lower value, for setting a blocking mode.

5. The method according to claim 1, which comprises detecting at least one of a duration and a distance of a power supply gap and outputting error messages when at least one of predetermined durations and distance values are exceeded, with a diagnostic system.

6. In a method for providing continuous power for electrical, converter-fed rail vehicles, having front and rear ends with front and rear current collectors, as seen in a travel direction, for making contact with the power supply, the improvement which comprises:

switching a traction converter from a traction mode to a regenerative braking mode over a period during which the rail vehicle travels a distance, as soon as the front current collector is not in contact with the power supply;

switching the traction converter from a braking mode to the regenerative braking mode; and predetermining a nominal regenerative braking value for the traction converter, a power requirement of a train power supply system and an inherent requirement of electrical components of the rail vehicle.

* * * * *